Sept. 29, 1970          A. JADEK          3,530,956
WEDGE-LOCKING SAWHORSE BRACKET
Filed Aug. 4, 1969
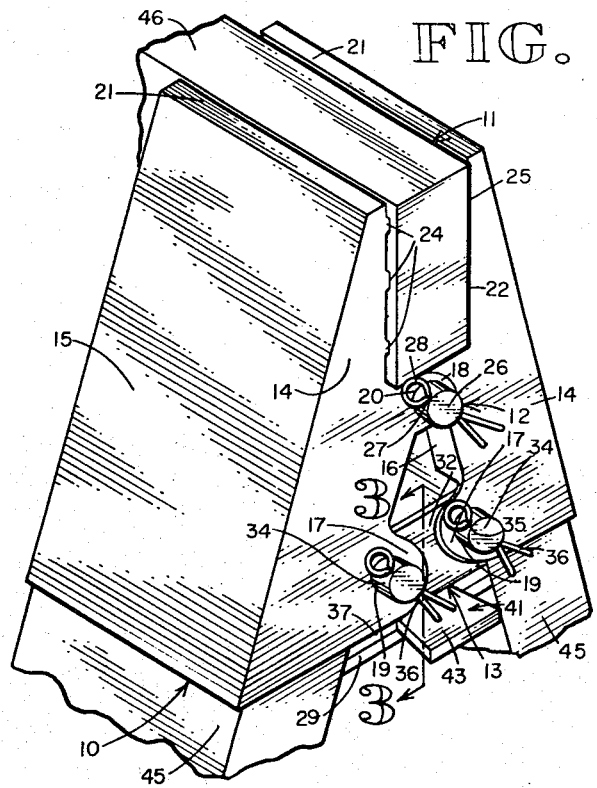
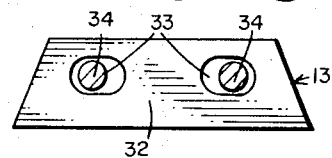
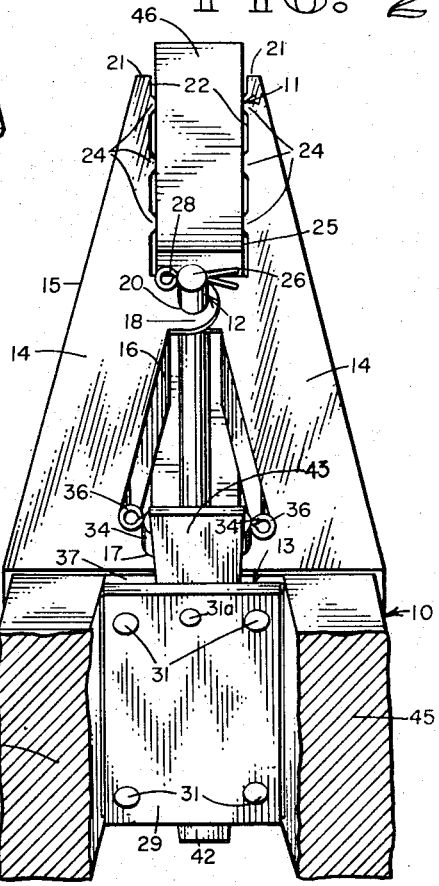
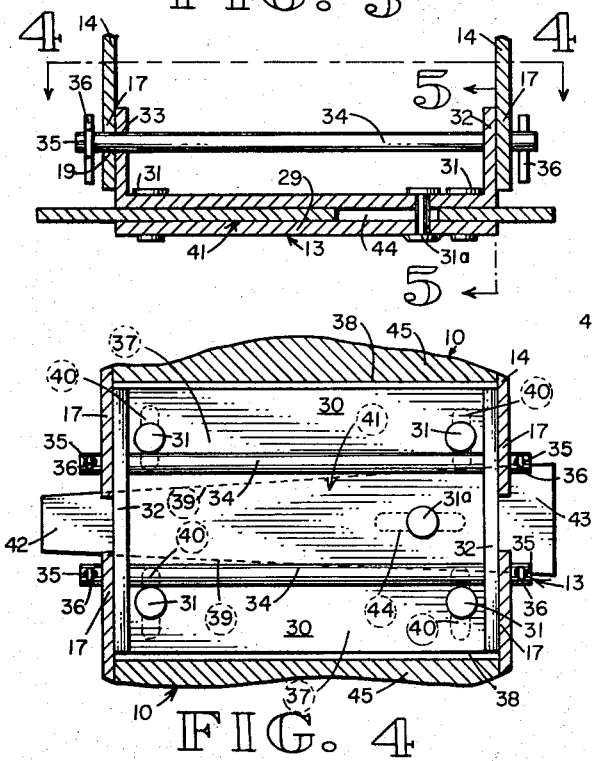
Adam Jadek, INVENTOR.
BY
ATTORNEY.

United States Patent Office 3,530,956
Patented Sept. 29, 1970

3,530,956
WEDGE-LOCKING SAWHORSE BRACKET
Adam Jadek, 1728 E. Hartson, Spokane, Wash. 99202
Filed Aug. 4, 1969, Ser. No. 847,027
Int. Cl. E04g *1/32;* F16m *11/00*
U.S. Cl. 182—186                                    5 Claims

ABSTRACT OF THE DISCLOSURE

A bracket to releasably join opposed legs to the beam of a sawhorse. The bracket provides paired leg elements, each carrying a saw horse leg, pivotably joined in scissor fashion to form a jaw to receive the horizontal saw horse beam. A wedge device, disposed between the legs and below the bracket pivot, moves the structure to releasably fasten all elements.

BACKGROUND OF INVENTION

Related applications

There are no applications related hereto now filed in this or any foreign country.

Field of invention

This invention relates generally the field of take-apart sawhorses and more particularly to a compound wedge operated bracket to releasably join paired opposed legs to the horizontal beam of a sawhorse.

Description of prior art

The typical sawhore generally used in many mechanical fields is essentially a horizontal beam supported in its end parts by two sets of paired, angularly opposed legs. Heretofore it has been found convenient to provide such a sawhorse structure that may be assembled and disassembled at will, and many such structures have become known.

Since the legs and beam of the sawhorse are essentially individual rigid, rectilinear elements, the take-apart structure may readily be accomplished by means of a bracket joining these elements; many such brackets have heretofore become known in the art. These brackets may be conveniently divided into two groups, a first providing a simple rigid, immovable structure with means for releasable joinder to the leg and beam elements and a second providing a compound, movably joined structure providing locking upon some particular motion or condition of the structure.

The first group of structures have generally proven to be quite simple and reasonably durable but their nature requires some sort of destricutive mechanical fastener communicating between bracket and sawhorse element and generally since the sawhorse elements are of wood, the assembly and disassembly causes rapid physical deterioration. The time of assembly and disassembly, and the dexterity required for this operation, have also been adverse conditions affecting the use of this structure.

In consequence the growing use trend has been toward brackets of the second group which generally have little physical deteriorating effect upon sawhorse elements and are simple and quick of assembly and disassembly. The instant invention provides a structure improved over the known members of this group, and distinguishable from them in providing a pivotably joined compound bracket movable by means of a wedge to a final supporting position wherein all sawhorse elements are positionally maintained. The wedge structure allows ready assemblage or disassemblage of the bracket by the blow of a hammer, but yet maintains a unique and rigid communication between the elements when in assembled condition. It also provides a bracket which readily adjusts to the variations in size of wooden sawhorse elements and rigidly positions such elements in proper array notwithstanding the normal configurational variations. Although wedge elements of sorts have been used with sawhorse brackets heretofore, particularly those of the first group above referred to, none have been used in a compound bracket to provide the unique locking features of my invention.

SUMMARY OF INVENTION

The instant invention provides a compound pivotably joined sawhorse bracket, movable to a supportive position by means of wedge activated motion of component parts, to join the paired opposed legs and beam elements of the traditional wooden sawhorse.

The bracket provides similar leg elements, each adapted to hold the vertically depending leg of a sawhorse, its lower part, and extending upwardly to cooperate with the other to form a jaw to hold the horizontal beam of the sawhorse. The paired elements are pivotably joined in opposed scissor fashion in their middle part so that the jaw might move from an opened to closed position. A fastening member carried between leg brackets provides spaced laterally movable leg dogs communicating between the legs with a wedge extending between the dogs, substantially parallel to the pivotable mounting of the leg elements, so that the wedge may be moved parallel to the axis of pivot of the leg elements to move the opposed dogs laterally to spread the bracket to cause fastening of the sawhorse elements in the bracket. Once the wedge is placed in fastening position friction maintains it in this position until forcibly overcome. The wedge may be conveniently moved to either a fastening or a released position by means of an impact tool.

In providing such a bracket structure it is:

A principal object of my invention to create a compound, pivotably joined, scissor type sawhorse bracket that may be moved to a fastening position by means of a wedge.

A further object of my invention to provide such a device that when moved to a fastening position creates great friction upon fastening wedge and all elements fastened to maintain position until the wedge friction be physically overcome.

A still further object of my invention to provide such a bracket that is simple of operation and placement and causes little physical damage to wooden sawhorse elements joined thereby.

A still further object of my invention to provide such a bracket that is of new and novel design, and of rugged and durable nature, of simple and economic manufacture, and otherwise well adapted to the uses and purposes for which it is intended.

Other and further objects of my invention will appear from the following specification and accompanying drawings which form a part of this application. In carrying out the objects of my invention, however, it is to be understood that its essential features are susceptible of change in design and structural arrangement with only one preferred and practical embodiment being illustrated in the accompanying drawings as required.

BRIEF DESCRIPTION OF DRAWINGS

In the accompanying drawings wherein like numbers of reference refer to similar parts throughout:

FIG. 1 is an isometric view of my invention joining paired-opposed legs of a sawhorse to the horizontal beam.

FIG. 2 is an isometric view of the invention of FIG. 1, looking upwardly from a lower position, to show the lower elements, their configuration and relationship.

FIG. 3 is a vertical cross-sectional view through the fastening structure of the device of FIG. 1, taken on the line 3—3 thereon in the direction indicated by the arrows.

FIG. 4 is a partial horizontal cross-sectional view of the device of FIG. 1 taken on the line 4—4 on FIG. 3 in the direction indicated by the arrows, to show the details of the wedge fastening device.

FIG. 5 is a cross-sectional view of the device of FIG. 1, taken on the line 5—5 of FIG. 3 in the direction indicated by the arrows, to show the loose connection of fastening structure to bracket elements.

DESCRIPTION OF PREFERRED EMBODIMENT

Referring now to the drawings in more detail and particularly to those of FIGS. 1 and 2, it is there seen that my invention generally includes similar opposed body elements each having leg bracket 10 in its lower portion and top beam jaw 11 in its upper portion, joined by pivot, structure 12 and loosely mounting medially depending, wedge fastening structure 13.

Leg bracket 10 is a three-sided structure comprising similar opposed ends 14 joined by side 15 carrying rearward leg ears 16, all configured to fit about the periphery of leg member 45, generally a rectilinear piece of 2 x 4 dimension lumber. The length of elements 14, 15 should be such as to extend over the upper portion of the leg member for some substantial distance, say at four or five inches, to provide appropriate structural rigidity for the assembled sawhorse. The lower portion of each end 14 carried inwardly extending wedge plate fastening ear 17 and the upper portion of each end carries inwardly extending joining ears 18, each offset appropriately from the other so that the joining ear of one side is immediately adjacent that of the other when positioned as shown in FIG. 1. Opposed wedge plate ears are provided with cooperating holes 19 to carry an axle joining the wedge plate thereto and joining ears 18 are provided with opposed cooperating holes 20 to receive the pivot axle therebetween.

Top beam jaw 11 is formed by the upward continuation of ends 14 and side 15 above the joining ears. Top element 21 closes the top of the structure. The jaw elements are configured, as illustrated in FIG. 1, so that when the sawhorse bracket be in extended position the legs will be positioned in an angular fashion (relative the top beam) and the jaw faces 27 of the opposed top beam jaws will be substantially parallel to and immediately adjacent the faces of the sawhorse beam. Preferably the inward facing surfaces of jaw face 22 are provided with plural inwardly projecting teeth 24 to aid in maintaining a firm contact between the jaws and the sawhorse beam 46; preferably the configuration of the teeth is such as to slightly displace the yieldable surface of the beam. The teeth aid in providing good contact with beams of sizes varying from the nominal. The exact configuration and array of teeth is not critical nor, in fact, is their existance essential to my invention, but it is advantageous.

Beam channel 25, formed by cooperating opposed beam jaws, is such as to fit immediately adjacent the beam and allow a slight projection of the top of the beam above top element 21 of the jaw so that material resting upon the sawhorse will be constantly resting upon the beam to prevent damage to material and excessive wear upon sawhorse brackets. Again preferably, but not necessarily, the upper surface of joining ears 18 will form the lower surface of beam channel 25 so that the beam has something rigid to rest upon when being positioned.

The bracket body members must be formed from some rigid, durable material, preferably sheet metal. Metal may be operated upon with the usual forming operations to create these structures and provides admirable physical properties. Undoubtedly other rigid materials, especially plastics, might serve the purposes of my invention, if not so well.

Pivotable joining structure 12 provides rod 26 extending through joining ears 18 of the paired opposed bracket body members. The communication of these members is such as to allow relative pivotable motion. The rod is of sufficient length to extend slightly beyond the outermost ear of each member, and a hole is provided in this extending portion to receive cotter keys 28 to maintain the rod in appropriate axial alignment.

Wedge fastening means 13 is seen in gross in FIG. 2 and in detail in FIGS. 3 and 4. It comprises lower rectilinear wedge plate 29 maintained at a spaced distance from and substantially parallel to upper wedge plate 30 by plural mechanical fasteners 31, in this instance rivets. The ends of upper wedge plate 30 support paired opposed fastening ears 32 extending upwardly therefrom adapted to fit immediately inwardly adjacent each of the wedge plate ears 17 of leg brackets 10. Horizontally elongate holes 33 are provided in each fastening ear 32 to cooperate with the similar holes 19 in the wedge plate ears to receive rods 34 therethrough to movably mount the wedge fastening structure to the leg bracket-jaw structure. Fastening ear holes 33 must be elongate and provide a loose fit for rods 34 for my device to be operative, as the rods, pivotably carried in the wedge plate ears, must move away from each other in the fastening operation. Rods 34 are of sufficient length to extend somewhat beyond the outermost extension of fastening ears 17 so that holes 35 may be provided in each end of the rods to receive cotter keys 36 to releasably maintain the rods in appropriate axial alignment. The dimensioning of wedge plates 29, 30 should be such as to allow the entry of normal leg member 16 within leg brackets 10 but yet maintain the lateral edges of the wedge plates immediately inwardly adjacent the leg members so that too extensive a motion of the wedge elements is not required for locking.

In the space between wedge plates 29, 30 are carried opposed wedging dogs 37, having outwardly extending edges 38 substantially parallel to the edges of the wedge plate and inwardly extending edges 39 angled to provide a sliding fit with the wedge element. Each of these wedge dogs is provided with plural laterally extending slots 40 to allow passage of fasteners 31 therethrough and still allow motion of the wedging dogs in a lateral direction for some slight distance. Planar wedge 41, fits between wedge plates 29, 30 and inward edges 39 of opposed wedging dogs 37, with forward end 42 and rearward end 43 projecting in an axial direction beyond both ends of the wedge plates. The wedge is provided with medial slot 44 to allow passage of fastener 31 carried between the wedge plates, to maintain the wedge between the plates while allowing motion in an axial wedging direction. Again the wedge fastening structure must be formed of some rigid, durable material and again I prefer to use sheet metal although other similar materials function.

Having thusly described the structure of my invention, its operation may now be understood, particularly with reference to FIG. 1.

Firstly a bracket is formed according to the foregoing specification and as illustrated in FIG. 1. This particular bracket is designed for use with rectilinear wooden beam and leg elements, in this instance 2 x 4 dimension lumber. To form the sawhorse with my bracket, the legs and horizontal beam are cut to appropriate length. By manual manipulation two legs are inserted in a bracket and the bracket positioned with one end of the horizontal beam between the beam jaws. In this condition, the larger outer end 38 of wedge 41 is struck with a hammer. This causes the wedge to move inwardly to move the wedging dogs 37 laterally outwardly, and since the wedging structure is supported in loose movable fashion on a frame independent of the bracket frame, the pivotably joined jaws are moved toward each other to tightly communicate about the upper beam member. This motion also causes wedge dogs 37 to move with some frictional force laterally outward to communicate with the inwardly facing surfaces of the opposed legs, to hold them in place in the leg brackets with some force. The other end elements are placed in similar fashion to form the completed sawhorse.

The friction created between the various wedge members is sufficient to maintain them in the fastening position until additional force be applied to release the wedge.

This is preferably accomplished by striking the smaller end 39 of wedge 41 with a hammer or similar impact tool. The top beam jaws may then be moved pivotably away from each other to release the beam therebetween and the wedging dogs 37 moved from contact with the inner surface of the legs to allow disassembly of the whole sawhorse structure.

It is to be noted that although the foregoing invention is described and illustrated for use 2 x 4 sawhorse elements, it might be equally well adapted to elements of other configuration.

It is also to be noted that the method of fastening the elements allows a variance of some degree in the dimensioning of the leg and beam elements while still allowing fastening in the specified fashion.

It is further to be noted from the description of the invention that hte one action of tightening the wedge against the wedging dog is the only action required to form a complete joinder of all sawhorse elements.

The foregoing description of my invention is necessarily of a detailed nature so that a specific embodiment of it might be set forth as required, but it is to be understood that various modifications of detail, rearrangement and multiplication of parts may be resorted to without departing from its spirit, essence, or scope.

Having thusly described my invention, what I desired to protect by Letters Patent, and

What I claim is:

1. An improved bracket of the nature aforesaid too releasably join paired, angularly opposed legs to the horizontal beam of a sawhorse, comprising in combination:

paired angularly opposed body elements, pivotably joined in their medial parts, each having depending leg brackets to receive a sawhorse leg and defining opposed beam jaws to receive the horizontal beam of a sawhorse above the pivotable joinder of the body elements, and wedge fastening means, loosely depending from the body elements in a medial position below the pivotable joinder of the body elements, including spaced wedge plates movably carrying spaced wedge dogs therebetween with a wedge between the wedge dogs to move them laterally outwardly in response to wedge motion to cause the dogs to engage the legs and maintain them in the leg brackets and force the beam jaws together to maintain the horizontal beam therebetween.

2. The invention of claim 1 further characterized by the inwardly facing surfaces of the beam jaw carrying plural spaced teeth adapted to indent into the surface of a horizontal beam to aid in maintaining the beam within the beam jaws.

3. The invention of claim 1 further characterized by the wedge fastening structure providing sufficient friction between wedge and wedge dogs to maintain a fastened position until the friction be overcome by external force.

4. An improved sawhorse bracket comprising in combination:

paired, angularly opposed body elements each having depending leg brackets to receive a sawhorse leg, paired opposed wedge plate ears carried by the leg brackets, medial, paired opposed inwardly, projecting ears and, an upwardly projecting beam jaw adapted to cooperate with the opposed beam jaw to support a sawhorse beam;

an axle communicating between the opposed joining ears to pivotally join the body elements;

a wedge fastening means having spaced parallel wedge plates structurally joined, paired opposed fastening ears, with horizontally elongate axle slots, upwardly projecting from the wedge plate structure to cooperate with the wedge plate ears of the body to loosely mount the wedge fastening means, spaced opposed wedge dogs carried for lateral motion between the wedge plates, and a wedge element longer than the wedge plates movably carried between the wedge plates and between the wedge dogs to cause the wedge dogs to move laterally outward to contact the opposed inner surfaces of leg elements carried in the leg brackets to hold the leg elements in their respective brackets and increase the angle between leg brackets; and paired axles communicating between each opposed pair of wedge plate ears to loosely mount the wedge fastening means between the opposed body elements below their pivotable motion of the body elements.

5. The invention of claim 4 wherein the beam jaws are further characterized by plural teeth on the beam facing surfaces to aid in maintaining a beam between the jaws.

References Cited
UNITED STATES PATENTS

| | | | |
|---|---|---|---|
| 2,132,285 | 10/1938 | Brown | 182—186 |
| 2,545,767 | 3/1951 | Dalton | 182—226 |
| 2,941,618 | 6/1960 | Larson | 182—186 |

REINALDO P. MACHADO, Primary Examiner

U.S. Cl. X.R.

182—226